Figure 1:
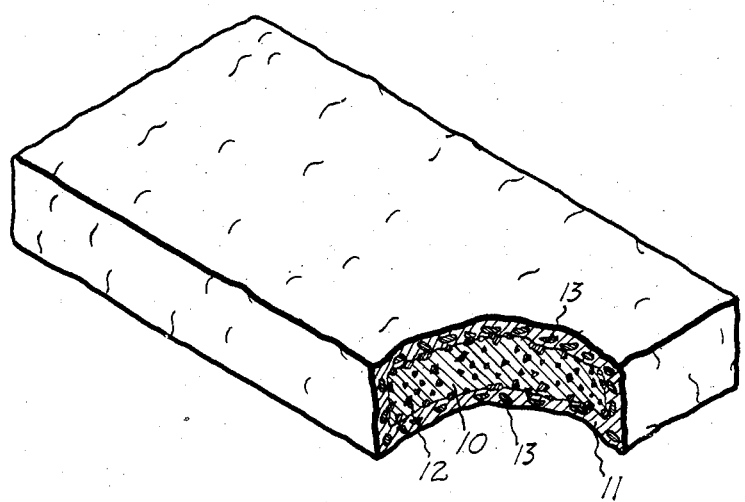

July 31, 1934.  T. ANAGNOS  1,968,732

ICE CREAM CONFECTION BAR

Filed May 15, 1933

Inventor
Tom Anagnos
By Jack A. Ashley
Attorney

Patented July 31, 1934

1,968,732

UNITED STATES PATENT OFFICE 1,968,732

ICE CREAM CONFECTION BAR

Tom Anagnos, Dallas, Tex.

Application May 15, 1933, Serial No. 671,195

1 Claim. (Cl. 99—16)

This invention relates to new and useful improvements in ice cream confection bars.

Ice cream bars consisting of a core of ice cream coated with an edible substance, such as chocolate or icing, are well-known as a confection. In producing these bars, it is customary to provide a core of ice cream and dip this core in molten chocolate or some other coating material. This material, when dry, is of a brittle nature and very easily cracks off in large pieces, particularly when the bar is bitten into. This is largely due because there is no particular mechanical bond or tying medium between the coating and the ice cream. An effort has been made to overcome this by the use of popcorn in the ice cream core, whereby the coating adheres to projecting portions of said popcorn.

While popcorn may be used, it has some objections as an ingredient of the ice cream core. Popcorn is of itself more or less tasteless and when mixed in the ice cream has a tendency to absorb the milk and detract from the palatableness of the ice cream.

One object of my invention is to provide a more effective bond between the ice cream core and the coating, whereby the coating will be more firmly attached to the core. More specifically stated, I employ in the core candy which is ground up into small particles or granules and is of a more or less brittle or hard nature so that these particles or granules will retain their shapes. The advantage of using candy in the ice cream core is that it does not absorb the milk or detract from the ice cream, but on the other hand it improves the flavor and enhances the edible qualities of the core. Further, when the core is dipped into the hot coating, the exposed candy particles are affected by the heat of such coating and have a tendency to dissolve or become more sticky, thereby providing an adhesive or flux between the bar and the coating.

A particular advantage is that chopped nuts, or other edible material, may be included in the coating and this will increase the bond between the coating and the core. The sticky flux or the exposed portions of the candy granules on the surfaces of the core will readily adhere to the pieces of chopped nuts in the coating, thus providing a most effective bond. By using candy in the core of the ice cream, a greater variation in flavor is provided and a more attractive confection is produced. Further, the crystal natures of candy and ice cream promote the bond therebetween, therefore candy granules are less likely to pull out of the surfaces of the ice cream core than farinaceous material.

A construction designed to carry out the invention will be hereinafter described, together with other features of the invention.

Figure 2:
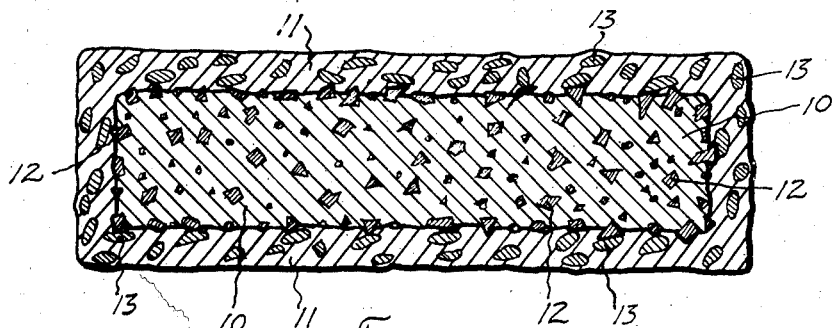

The invention will be more readily understood from a reading of the following specification and by reference to the accompanying drawing in which an example of the invention is shown, and wherein:

Figure 1 is a perspective view of an ice cream bar made in accordance with the invention, a portion of one corner being broken away to show the interior construction, and Figure 2 is an enlarged cross-section of the same.

In the drawing the numeral 10 designates a core and 11 a coating. The core may be of ice cream, but other confections such as sherbet, frozen custards, and the like, may be used, and the invention is, therefore, not to be limited to ice cream. The coating may be of chocolate or any other suitable coating material and may contain sufficient paraffin or equivalent material to assist in the congealing of the coating; however, the paraffin may be dispensed with.

In manufacturing the bar, candy suitable for the purpose is ground up so as to reduce it to small particles or granules 12, which may vary in size from that of a head of a pin to that of a small pea. I may use such candy as pecan brittle, or any other candy suitable for the purpose. Certain kinds of taffy give very good results. The candy granules are mixed in as an ingredient of the ice cream and thus become evenly distributed therethrough. When the ice cream is made, it is formed into a slab and the core 10 is cut therefrom in a slab cutter, such as is in common use. The presence of the candy granules results in numerous small and irregular projections on all the surfaces of each core. The candy adds greatly to the edibility of the core and also acts to give it body, as well as a very desirable flavor.

The core 10 is dipped in the usual manner into the bath of chocolate or other coating. This coating may contain ground up nuts, or other edible material, in order to give it bulk and roughness, and to add to the food value and flavor. The heat of the coating has a tendency to melt or soften the candy granules, whereby a sticky flux or adhesive is provided on the surfaces of the core, which will cause the coating to adhere thereto because the granules are embedded in said core. Chopped nuts, or other edible materials 13 are embedded in the coating, and such chopped particles will adhere to the candy particles, thus making a more permanent bond.

When ground popcorn or farinaceous material is used in the core, there is a chance for the same to become soggy, due to the melting of the ice cream. The popcorn as usually used is ground into flakes and when these flakes become wet, their structure is weakened. Candy and nuts are free from these objections. Ground popcorn used only in the coating is not subject to these objections, but unless there is a bond such as candy in the core, the presence of the farinaceous material in the coating alone makes it more difficult to unite the core and the coating.

The finished bar is found to have many advantages, some of which will be pointed out. The coating remains firm and does not crumble when held between the fingers and bitten into; neither does it crack or peel off. The use of candy in the core makes a heavier bar and particularly adds sweetness so that less sugar is required in the ice cream. Further, the use of candy gives a distinctive flavor and makes a more satisfying edible. Candy in the core and nuts or other material in the coating, makes a more substantial bar and one that will better hold its shape when exposed to heat.

It has been found that a bar produced in accordance with this invention has all of the advantages of the ordinary ice cream bar, as well as some of the advantages of the usual candy bar. By using a goodly portion of candy in the ice cream, the desire of the consumer for candy, as well as for ice cream, is met. It has also been found that the heat of the chocolate coating partially melts the ice cream and this with the dissolved candy forms a thick sweet syrup which is very sticky, and thus aids in tying the coating to the bar, rather than defeating adhesion, as is the usual result.

The description which has been given, recites more or less detail of a particular embodiment of the invention, which is set forth as new and useful, however, I desire it understood that the invention is not limited to such exact details of construction, because it is manifest that changes and modifications may be made, within the scope of the appended claim, without departing from the spirit of the invention.

What I claim and desire to secure by Letters Patent, is:

A confection comprising, a core of normally liquid material frozen to a substantially solid state, the core being adapted to be coated by dipping into molten edible coating material, said first mentioned material having mixed therein hard candy granules, some of which protrude from its surface and are softened by the heat of the molten coating material when the core is dipped thereinto, whereby to provide for adhesion of the coating material to said core, and an edible coating for the core containing pieces of solid edible material for adhering to the candy granules when the same are softened by the heat of the coating.

TOM ANAGNOS.